(12) United States Patent
Sheng et al.

(10) Patent No.: US 12,073,621 B2
(45) Date of Patent: Aug. 27, 2024

(54) METHOD AND APPARATUS FOR DETECTING INFORMATION INSERTION REGION, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Hui Sheng, Shenzhen (CN); Dongbo Huang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 352 days.

(21) Appl. No.: 17/370,764

(22) Filed: Jul. 8, 2021

(65) Prior Publication Data

US 2021/0406549 A1     Dec. 30, 2021

Related U.S. Application Data

(63) Continuation of application No. PCT/CN2020/097782, filed on Jun. 23, 2020.

(30) Foreign Application Priority Data

Jun. 28, 2019   (CN) .......................... 201910578322.7

(51) Int. Cl.
*G06K 9/00*     (2022.01)
*G06F 18/23*    (2023.01)
(Continued)

(52) U.S. Cl.
CPC .............. *G06V 20/41* (2022.01); *G06F 18/23* (2023.01); *G06V 10/255* (2022.01);
(Continued)

(58) Field of Classification Search
CPC ...... G06F 18/23; G06V 10/25; G06V 10/255; G06V 10/462; G06V 20/41; G06V 20/49;
(Continued)

(56) References Cited

U.S. PATENT DOCUMENTS

| 2008/0013784 A1* | 1/2008 | Takeshima ........... G06V 10/267 382/260 |
| 2010/0303372 A1* | 12/2010 | Zhao ...................... H04N 5/21 382/254 |
| 2014/0254919 A1* | 9/2014 | Sun ........................... G06T 7/11 382/154 |

(Continued)

FOREIGN PATENT DOCUMENTS

| CN | 101621636 A | 1/2010 |
| CN | 101621636 B * | 4/2011 |

(Continued)

OTHER PUBLICATIONS

W. Chen, J.-S. Yeh and T.-L. Chia, "Automatic insertion of advertisements into a video sequence," 2010 International Conference on Machine Learning and Cybernetics, Qingdao, China, 2010, pp. 2121-2126, doi: 10.1109/ICMLC.2010.5580493. (Year: 2010).*

(Continued)

*Primary Examiner* — Michael J Vanchy, Jr.
(74) *Attorney, Agent, or Firm* — ArentFox Schiff LLP

(57) ABSTRACT

A method for detecting an information insertion region is provided. In the method, a video is obtained. The video is segmented to obtain video fragments, each of the video fragments including a subset of image frames in the video. A target frame is obtained in the video fragments. Objects in the target frame are identified and segmented, to obtain labeling information corresponding to the objects. A target object is determined according to the labeling information. Clustering is performed on the target object, to obtain a plurality of candidate to-be-inserted regions. A target can- (Continued)

didate to-be-inserted region is determined from the candidate to-be-inserted regions. Further, maximum rectangle searching is performed in the target candidate to-be-inserted region to obtain a target to-be-inserted region in which an image is to be inserted.

20 Claims, 8 Drawing Sheets

(51) Int. Cl.
| | | |
|---|---|---|
| *G06K 9/32* | (2006.01) | |
| *G06K 9/46* | (2006.01) | |
| *G06K 9/62* | (2022.01) | |
| *G06V 10/20* | (2022.01) | |
| *G06V 10/46* | (2022.01) | |
| *G06V 20/40* | (2022.01) | |
| *H04N 21/44* | (2011.01) | |
| *H04N 21/81* | (2011.01) | |
| *H04N 21/845* | (2011.01) | |

(52) U.S. Cl.
CPC ............ *G06V 10/462* (2022.01); *G06V 20/49* (2022.01); *H04N 21/44008* (2013.01); *H04N 21/812* (2013.01); *H04N 21/8456* (2013.01)

(58) Field of Classification Search
CPC ............ G06V 20/70; H04N 21/23418; H04N 21/4316; H04N 21/44008; H04N 21/812; H04N 21/8456
See application file for complete search history.

(56) References Cited

U.S. PATENT DOCUMENTS

| | | | |
|---|---|---|---|
| 2016/0133027 A1 | 5/2016 | Zhao et al. | |
| 2017/0278289 A1* | 9/2017 | Marino | ............... G06T 7/536 |
| 2017/0358092 A1 | 12/2017 | Bleibel et al. | |
| 2019/0075339 A1* | 3/2019 | Smith | ............. H04N 21/25883 |

FOREIGN PATENT DOCUMENTS

| | | |
|---|---|---|
| CN | 105303163 A | 2/2016 |
| CN | 107818302 A | 3/2018 |
| CN | 107948721 A | 4/2018 |
| CN | 109168034 A | 1/2019 |
| CN | 109302619 A | 2/2019 |
| CN | 109308456 A | 2/2019 |
| CN | 109325502 A | 2/2019 |
| CN | 109886130 A | 6/2019 |
| CN | 110458820 A | 11/2019 |

OTHER PUBLICATIONS

H. Zhang, X. Cao, J. K. L. Ho and T. W. S. Chow, "Object-Level Video Advertising: An Optimization Framework," in IEEE Transactions on Industrial Informatics, vol. 13, No. 2, pp. 520-531, Apr. 2017, doi: 10.1109/TII.2016.2605629. (Year: 2017).*
International Search Report Issued in Application PCT/CN2020/097782 on Sep. 24, 2020 with English Translation, (5 pages).
Written Opinion Issued in Application PCT/CN2020/097782 on Sep. 25, 2020 (4 pages).
Chinese Office Action issued Feb. 10, 2022 in Application No. 201910578322.7 with English Translation.

* cited by examiner

METHOD AND APPARATUS FOR DETECTING INFORMATION INSERTION REGION, ELECTRONIC DEVICE, AND STORAGE MEDIUM

RELATED APPLICATIONS

This application is a continuation of International Application No. PCT/CN2020/097782, entitled "METHOD AND APPARATUS FOR DETECTING INFORMATION EMBEDDING REGION, ELECTRONIC DEVICE, AND STORAGE MEDIUM" and filed on Jun. 23, 2020, which claims priority to Chinese Patent Application No. 201910578322.7 filed on Jun. 28, 2019. The entire disclosures of the prior applications are hereby incorporated by reference in their entirety.

FIELD OF THE TECHNOLOGY

This disclosure relates to the field of computer technologies, including a method for detecting an information insertion region, an apparatus for detecting an information insertion region, an electronic device, and a storage medium.

BACKGROUND OF THE DISCLOSURE

As the digitization of information becomes more mature, electronic media advertisements have gradually become the main advertising communication form. Taking video advertisements as an example, video advertisements may be divided into two forms: Video-In and Video-Out, where Video-In is an inserted advertisement and is a form of soft advertisement, and a screen or a physical advertisement is inserted in a table, a wall surface, a photo frame, or a billboard in a video; and Video-Out is a scene pop-up, and pop-ups relevant to video content are displayed based on recognition of a vehicle, a human face, a target, or a scene in a video image.

In the related art, for video advertisements in the Video-In form, a professional designer is generally required to search for insertion advertising spaces in a video completely manually, which consumes much manpower and time.

SUMMARY

Embodiments of this disclosure include a method for detecting an information insertion region, an apparatus for detecting an information insertion region, an electronic device, and a non-transitory computer-readable storage medium, to improve the efficiency of detecting an insertion advertising space in a video.

An embodiment of this disclosure provides a method for detecting an information insertion region. In the method, a video is obtained. The video is segmented to obtain video fragments, each of the video fragments including a subset of image frames in the video. A target frame is obtained in the video fragments. Objects in the target frame are identified and segmented, to obtain labeling information corresponding to the objects. A target object is determined according to the labeling information. Clustering is performed on the target object, to obtain a plurality of candidate to-be-inserted regions. A target candidate to-be-inserted region is determined from the candidate to-be-inserted regions. Further, maximum rectangle searching is performed in the target candidate to-be-inserted region to obtain a target to-be-inserted region in which an image is to be inserted.

An embodiment of this disclosure further provides an apparatus for detecting an information insertion region. The apparatus includes processing circuitry configured to obtain a video, and segment the video to obtain video fragments, each of the video fragments including a subset of image frames in the video. The processing circuitry is configured to obtain a target frame in the video fragments. The processing circuitry is configured to identify and segment objects in the target frame, to obtain labeling information corresponding to the objects. The processing circuitry is configured to determine a target object according to the labeling information. The processing circuitry is configured to perform clustering on the target object, to obtain a plurality of candidate to-be-inserted regions. The processing circuitry is configured to determine a target candidate to-be-inserted region from the candidate to-be-inserted regions. Further, the processing circuitry is configured to perform maximum rectangle searching in the target candidate to-be-inserted region to obtain a target to-be-inserted region in which an image is to be inserted.

An embodiment of this disclosure further provides an electronic device, including: one or more processors; and a storage apparatus, configured to store one or more programs, the one or more programs, when executed by the one or more processors, implementing the method for detecting an information insertion region provided in the embodiments of this disclosure.

An embodiment of this disclosure further provides a non-transitory computer-readable storage medium, storing instructions which when executed by at least one processor cause the at least one processor to perform the method for detecting an information insertion region provided in the embodiments of this disclosure.

The application of the method and the apparatus for detecting an information insertion region, the electronic device, and the non-transitory computer-readable storage medium provided in the embodiments of this disclosure can have at least the following beneficial technical effects:

Shot segmentation is first performed on an obtained to-be-inserted video to obtain video fragments, a target frame is then determined from the video fragments, and objects in the target frame are identified and segmented to obtain labeling information corresponding to all objects in the target frame. A target object is then determined according to the labeling information, and the target object is clustered to obtain a plurality of candidate to-be-inserted regions. A target candidate to-be-inserted region is finally determined from the candidate to-be-inserted regions, and maximum rectangle searching is performed in the target candidate to-be-inserted region, to obtain a target to-be-inserted region. In this way, whether there is an information insertion region in a video may be automatically detected, thereby avoiding manually label screening and reducing labor costs. Meanwhile, time for detecting an information insertion region can be greatly reduced, and the insertion efficiency and accuracy of a video advertisement are improved.

BRIEF DESCRIPTION OF THE DRAWINGS

Accompanying drawings herein are incorporated into the disclosure and constitute a part of this disclosure, show embodiments consistent with this disclosure, and are used for describing principles of this disclosure. The accompanying drawings described below are merely some embodiments of this disclosure, and a person of ordinary skill in the art may further obtain other accompanying drawings according to the accompanying drawings. In the drawings.

DESCRIPTION OF EMBODIMENTS

Figure 1:
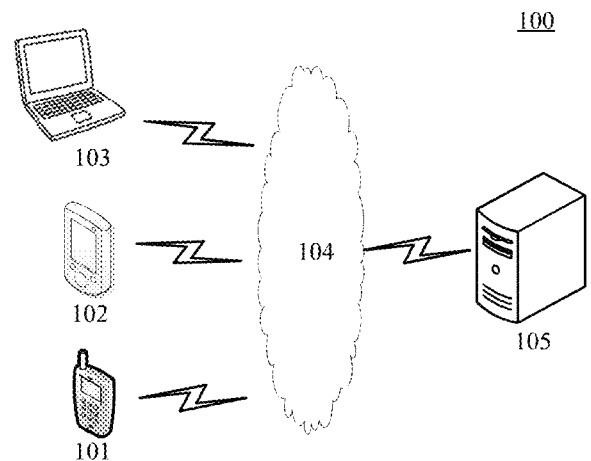
FIG. 1 is a schematic diagram of a system architecture for performing a method for detecting an information insertion region according to an embodiment of this disclosure.

Exemplary implementations will now be described more thoroughly with reference to the accompanying drawings. However, the exemplary implementations can be implemented in various forms and are not to be construed as being limited to the examples herein. Conversely, such implementations are provided to provide more detail and convey the concepts of the exemplary implementations to a person skilled in the art.

In addition, the described features, structures, or characteristics may be combined in one or more embodiments in any appropriate manner. In the following descriptions, specific details are provided to give a more comprehensive understanding of the embodiments of this disclosure. However, a person of ordinary skill in the art is to be aware that, the technical solutions in this disclosure may be implemented without one or more of the particular details, or another method, unit, apparatus, or step may be used. In other cases, well-known methods, apparatuses, implementations, or operations are not shown or described in detail, in order not to obscure the aspects of this disclosure.

The block diagrams shown in the accompanying drawings are merely functional entities and do not necessarily correspond to physically independent entities. That is, the functional entities may be implemented in a software form, or in processing circuitry such as one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Before the embodiments of the present disclosure are further described in detail, terms involved in the embodiments of the present disclosure are described, and the terms involved in the embodiments of the present disclosure are applicable to the following explanations.

Maximum rectangle searching: a manner to determine, by searching for adjacent pixel points with the same pixel value within a specific region, a rectangular region with a greatest area from the specific region. For example, maximum rectangle searching may be implemented in the following manner.

Using any pixel point in a target candidate to-be-inserted region as a reference point, and searching for an adjacent pixel point with the same pixel value according to a pixel value of the reference point. When the adjacent pixel point exists, using the adjacent pixel point as the reference point, and repeating the foregoing operation until all adjacent pixel points with the same pixel value are obtained. Using the any pixel point as a vertex, and forming rectangles according to the vertex and the adjacent pixel points. Further, calculating areas of the rectangles, selecting a target rectangle with a greatest area, and using the region corresponding to the target rectangle as a target to-be-inserted region.

FIG. 1 is a schematic diagram of an exemplary system architecture for performing a method for detecting an information insertion region according to an embodiment of this disclosure.

As shown in FIG. 1, a system architecture 100 may include a terminal device (which may be one or more of a smartphone 101, a tablet computer 102, and a portable computer 103 shown in FIG. 1, or may be a desktop computer, and the like), a network 104, and a server 105. The network 104 is configured to provide a medium of a communication link between the terminal device and the server 105. The network 104 may include various connection types, for example, a wired communication link, and a wireless communication link.

It is to be understood that the quantity of terminal devices, the quantity of networks, and the quantity of servers in FIG. 1 are merely illustrative. There may be any quantity of terminal devices, any quantity of networks, and any quantity of servers according to an actual requirement. For example, the server 105 may be a server cluster including a plurality of servers.

In some embodiments, the terminal device 101, or a terminal device 102 or 103 sends a to-be-inserted video obtaining request to the server 105 by using the network 104, where the to-be-inserted video obtaining request includes a video serial number of a to-be-inserted video. The server 105 stores a plurality of numbered videos, the to-be-inserted video corresponding to the video serial number in the to-be-inserted video obtaining request may be obtained by matching the obtained video serial number with all video serial numbers, and the server 105 may send the matched to-be-inserted video to the terminal device 101 (or the terminal device 102 or 103) by using the network 104. After receiving the to-be-inserted video, the terminal device performs shot segmentation on the to-be-inserted video to obtain video fragments, obtains a target frame from the video fragments, and identifies and segments objects in the target frame, to obtain labeling information corresponding to one or more object, and in some embodiments all objects, where the labeling information includes classification information, confidence levels, masks, and calibration boxes of the objects. The terminal device 101 then determines a target object according to the labeling information, clusters the target object to obtain a plurality of candidate to-be-inserted regions in the target object, determines a target candidate to-be-inserted region from the plurality of candidate to-be-inserted regions, and performs maximum rectangle searching in the target candidate to-be-inserted region to obtain a target to-be-inserted region. The target to-be-inserted region is an information insertion region that may be used for video advertisement insertion.

According to the application of the embodiments of this disclosure, on one hand, whether there is an information insertion region in a video may be automatically detected, thereby avoiding manually label screening and reducing labor costs; on the other hand, time for detecting an information insertion region can be greatly reduced, and the insertion efficiency of a video advertisement can be improved. By performing maximum rectangle searching in the target candidate to-be-inserted region to obtain the target to-be-inserted region, the accuracy of detecting an information insertion region may be improved.

In some embodiments, the method for detecting an information insertion region provided in the embodiments of this disclosure may be performed by a terminal device, and correspondingly, an apparatus for detecting an information insertion region may be disposed in a terminal device. In some other embodiments, the method for detecting an information insertion region provided in the embodiments of this disclosure may alternatively be performed by a server.

Figure 2A:
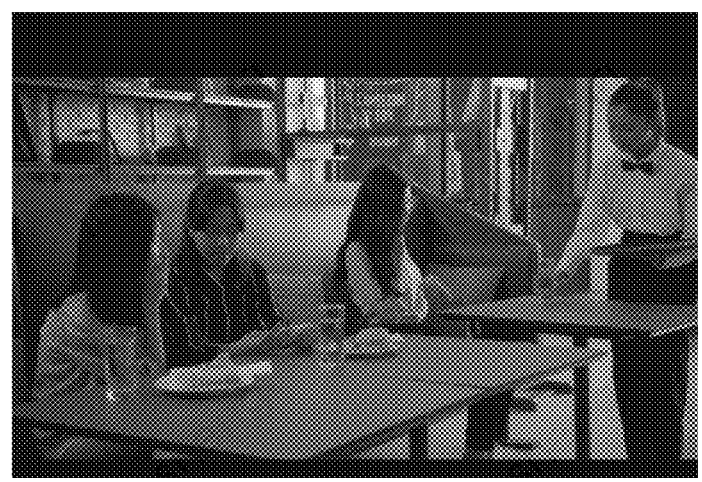
FIG. 2A to FIG. 2C are diagrams showing an effect of insertion in a table scene in the related art.
Figure 2B:
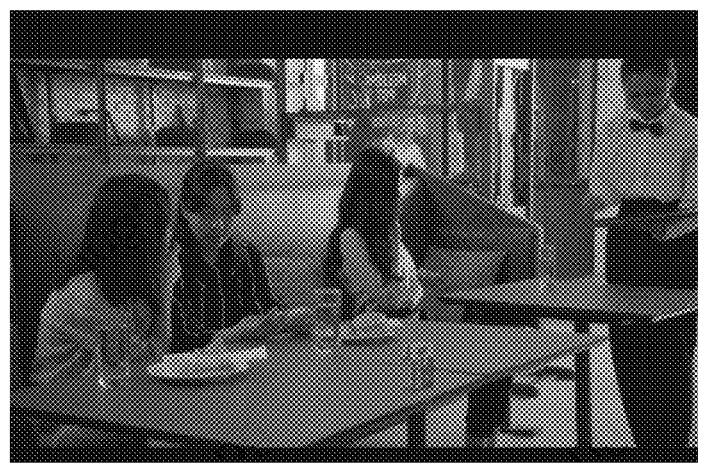
Figure 2C:

In the related art of this field, advertisement insertion performed in a Video-In manner is used as an example. To insert an entity, a 3D model or a print advertisement in a video, insertion is generally performed on a table, a wall surface, or a photo frame. However, in the related art, video insertion advertising space searching is completed by a professional designer completely manually. FIG. 2A to FIG. 2C are diagrams showing an exemplary effect of insertion in a table scene. FIG. 2A is an image in an original video, as shown in FIG. 2B, an entity or object is inserted into an advertising space by detecting an advertising space on the table, and as shown in FIG. 2C, a 3D model and a poster may be alternatively inserted into the advertising space at the same time.

However, time required to manually search for an advertising space insertion opportunity is generally 1.5 times of a duration of a video, which can be quite time-consuming and labor-intensive for a video advertisement inserting party, can seriously affect the efficiency of advertisement insertion, and may have a defect of low accuracy of an advertising space, further affecting an effect of advertisement insertion.

In view of the problems in the related art, embodiments of this disclosure first provide a method for detecting an information insertion region, and the method for detecting an information insertion region in the embodiments of this disclosure may be used for video advertisement insertion, and the like. Implementation details of the technical solutions of the embodiments of this disclosure are described in detail below by using the video advertisement insertion as an example.

Figure 3:
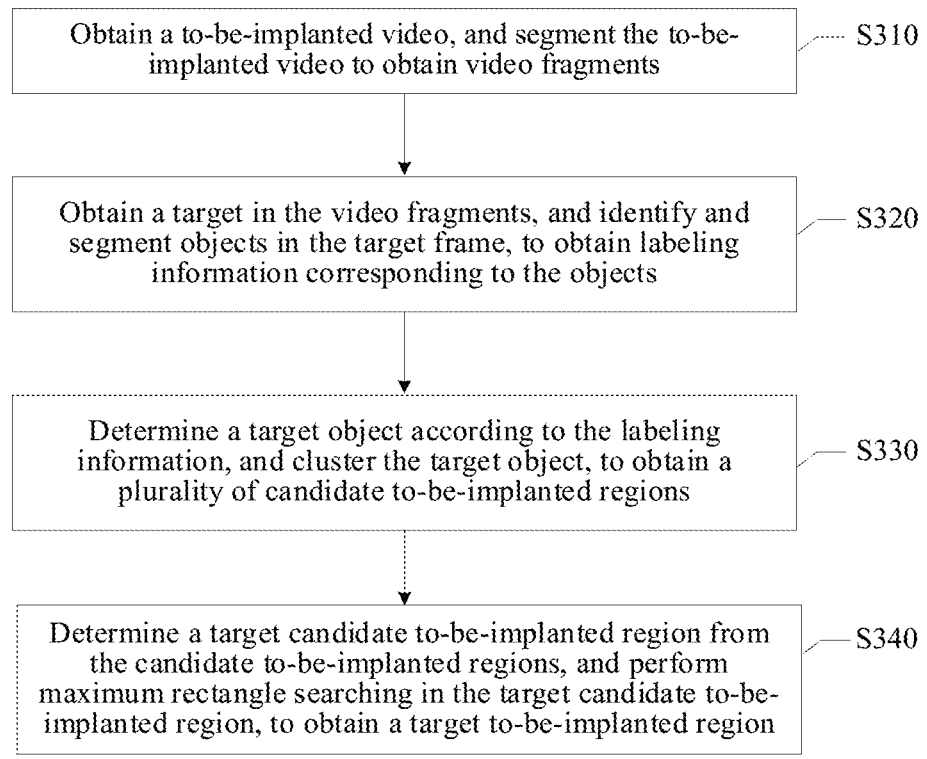
FIG. 3 is a flowchart of a method for detecting an information insertion region according to an embodiment of this disclosure.

FIG. 3 exemplarily shows a flowchart of a method for detecting an information insertion region provided in embodiments of this disclosure. The method for detecting an information insertion region may be performed by a terminal device, and the terminal device may be the terminal device shown in FIG. 1. Referring to FIG. 3, the method for detecting an information insertion region can at least include steps S310, S320m S330, and step S340, which are described in further detail below.

In step S310, a to-be-inserted video is obtained and the to-be-inserted video can be segmented to obtain video fragments.

In some embodiments, the video advertisement insertion is a novel technical system that intelligently inserts an advertisement in a video that has been completed (e.g., the to-be-inserted video) by using a computer vision technology. A user may search for a video online to obtain the to-be-inserted video, or may obtain the to-be-inserted video from a video file folder or a video database of the terminal device 101, and the to-be-inserted video may be a video file in any format such as avi., mp4., rmvb., and the like, which is not limited in the embodiments of this disclosure.

In some embodiments, a to-be-inserted video obtaining request may be sent to the server 105 by using the terminal device 101, where the to-be-inserted video obtaining request includes a video serial number of the to-be-inserted video, and the video serial number includes identification information such as any serial number format, for example, a serial number in a digital format, or a serial number in English letters plus digits. After parsing the to-be-inserted video obtaining request to obtain the video serial number, the server 105 may match the video serial number with video serial numbers of all videos stored in the server, to obtain the to-be-inserted video corresponding to the video serial number in the to-be-inserted video obtaining request. The server 105 may return the to-be-inserted video obtained through matching to the terminal device 101, for the terminal device 101 to search for an advertising space in the to-be-inserted video.

In some embodiments, after the to-be-inserted video is received, the to-be-inserted video may be segmented to obtain video fragments constituting the to-be-inserted video. A basic structure of a video is a hierarchical structure formed by frames, shots, scenes, and video programs. A frame is a static image and is a minimum logical unit constituting a video, a dynamic video is formed by consecutively playing frame sequences that are continuous in time according to an equal interval. A shot is a frame sequence photographed consecutively from startup to shutdown of a camera, describes an event or a part of a scene, does not include or includes relatively weak semantic information, and emphasizes the similarity between visual content constituting a frame. A scene refers to consecutive shots that are semantically relevant, where the shots may be different angles or photographed in different skills of the same object, or may be a combination of shots with the same subject and event, and emphasizes semantical relevance. A video program can include a complete event or story, and as a highest-hierarchy video content structure, include a composition relationship of a video and summarization, semantics, and general descriptions of the video. To effectively identify an information insertion region, a shot may be used as a processing unit, that is, each shot is used as a video fragment. During actual application, shot segmentation may be performed on the to-be-inserted video, to segment the to-be-inserted video into a plurality of shots, to further obtain video fragments constituting the to-be-inserted video.

Figure 4:
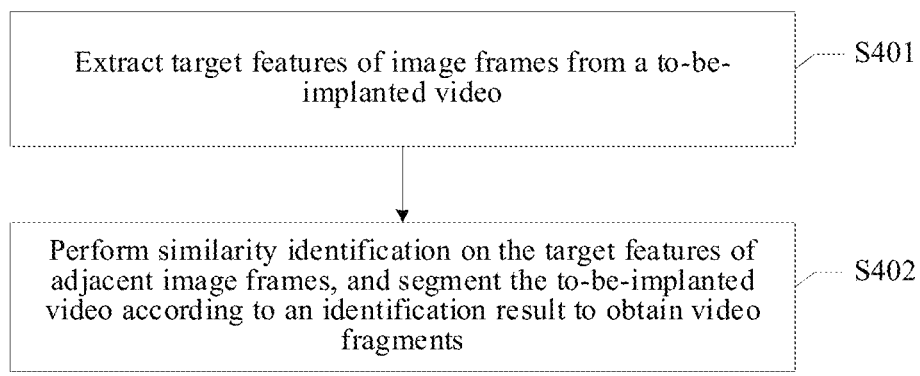
FIG. 4 is a flowchart of a method for segmenting a to-be-inserted video according to an embodiment of this disclosure.

In some embodiments, the to-be-inserted video may be segmented through similarity identification. FIG. 4 shows a schematic flowchart of a method for segmenting a to-be-inserted video. As shown in FIG. 4, in step S401, target features of image frames can be extracted from the to-be-inserted video. In step S402, similarity identification can be performed on the target features of adjacent image frames, and the to-be-inserted video can be segmented according to an identification result to obtain video fragments.

When similarity identification is performed herein, similarity comparison may be performed on each pixel in two adjacent image frames. However, there can be a large quantity of pixels in an image. If similarities between pixels are compared one by one, a large quantity of resources may need to be occupied and the data processing efficiency may be low. Therefore, target features may be extracted from the to-be-inserted video, where the target feature may be a multi-dimensional feature in an image frame included in the to-be-inserted video, and similarity identification is performed on the target features of the adjacent image frames to determine a boundary image frame of adjacent shots.

In some embodiments, step S402 of performing similarity identification on the target features of adjacent image frames, and segmenting the to-be-inserted video according to an identification result to obtain the video fragments may include calculating a distance between the target features of the adjacent image frames, and performing similarity identification according to the distance, where the distance may be a Euclidean distance, a cosine distance, or the like, the Euclidean distance is used as an example, after the Euclidean distance between the target features of the adjacent image frames is obtained, the Euclidean distance may be compared with a preset distance threshold, to determine a similarity between the adjacent image frames. When the distance is less than the preset distance threshold, it is determined that the adjacent image frames belong to the same video fragment; and when the distance is greater than or equal to the preset distance threshold, it is determined that the adjacent image frames belong to different video fragments.

In step S320, a target frame in the video fragments can be obtained, and objects in the target frame can be identified and segmented, to obtain labeling information corresponding to the objects.

In some embodiments, during information insertion, insertion may be performed in a typical and representative frame in a shot. For example, inserting information in a key frame or a representative frame may improve the insertion efficiency. Therefore, after the to-be-inserted video is segmented, one or more target frames (which may be key frames of a video) may be determined from the video fragments, and a target to-be-inserted region that may be used for advertisement insertion is obtained from the target frame by processing objects in the target frame.

In some embodiments, the objects in the target frame may be identified and segmented by using an instance segmentation model, to classify the objects in the target frame and obtain labeling information corresponding to the objects. The instance segmentation model may preprocess a target frame inputted into the instance segmentation model, and perform a convolution operation on the target frame after the preprocessing to extract features, to further obtain a feature image. The instance segmentation model may then process the feature image by using a candidate region generation network to obtain a plurality of candidate regions of interest, and perform classification and regression on the plurality of candidate regions of interest to obtain a target region of interest. The instance segmentation model may then align pixels of the target region of interest with pixels of the region in the target frame; and perform operations such as classification, bounding box regression, and mask generation on the target region of interest, to obtain the labeling information corresponding to the objects in the target frame.

Figure 5:
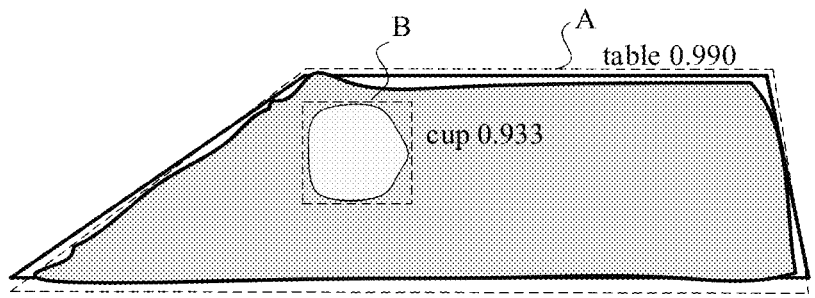
FIG. 5 is labeling information of objects outputted by an instance segmentation model according to an embodiment of this disclosure.

In some embodiments, the instance segmentation model may be a Mask R-CNN mode. In other embodiment, the instance segmentation model may be another machine learning model that can identify, segment, and mark objects in a target frame. After the target frame is processed by using the instance segmentation model, the labeling information corresponding to the objects in the target frame may be obtained. The labeling information may include classification information, a confidence level, a mask, and a calibration box of an object. FIG. 5 shows labeling information of objects outputted by the instance segmentation model. As shown in FIG. 5, there are a table and a cup placed on the table in an inputted target frame, the table and the cup may be segmented through identification and segmentation of the instance segmentation model, and labeling is performed by using masks and labeling boxes with different colors, where a deep color region is a mask corresponding to the table, a dashed line box A is a labeling box corresponding to the table, corresponding classification information is table, and a confidence level is 0.990; and a light color region is a mask corresponding to the cup, a dashed line box B is a labeling box corresponding to the cup, corresponding classification information is cup, and a confidence level is 0.933.

Before the target frame is processed by using the instance segmentation model, the instance segmentation model may be trained by using a large quantity of image frames as training samples. For example, image frames in one or more videos may be used as training samples, the training samples are inputted into a to-be-trained instance segmentation model, and whether the model is trained is determined by comparing labeling information outputted by the model with labeling information corresponding to the training samples.

In step S330, a target object can be determined according to the labeling information, and the target object can be clustered, to obtain a plurality of candidate to-be-inserted regions.

In some embodiments, after the labeling information of the objects in the target frame is obtained, a target object may be obtained according to the labeling information. For example, if advertisement insertion is to be performed on a table, an object of which a category is table may be obtained according to the classification information of the objects in the labeling information. For example, if one or more tables exist in the target frame, the one or more tables may be determined as target objects, and a target to-be-inserted region is determined from the target objects, or one table is selected from the one or more tables as a target object, and a target to-be-inserted region is determined from the target object.

During actual implementation, to improve an effect of advertisement insertion and reduce overhead of an advertiser, advertisement insertion is only performed at a relatively conspicuous position in some embodiments. In this way, a target object may be determined from a plurality of to-be-inserted objects, and the target object is clustered to obtain a plurality of candidate to-be-inserted regions therein.

In some embodiments, a target object for insertion may be determined from a plurality of to-be-inserted objects according to an area of a mask in the labeling information. In some embodiments, a to-be-inserted object corresponding to a mask with a greatest area is selected as the target object. For example, a table with a greatest mask area is selected. The table can occupy a major position in the target frame, and if advertisement insertion is performed on the table, when a user watches a video, the advertisement may be noticed, thereby improving a user reach rate of the advertisement.

In some embodiments, before the target object is obtained according to the labeling information, the objects in the target frame may be screened. During actual application, confidence levels corresponding to the objects may be compared with a preset confidence level threshold, when a confidence level of an object is greater than the preset confidence level threshold, the object is reserved, and an object of which a confidence level is less than or equal to the preset confidence level threshold is deleted. The preset confidence level threshold may be set according to an actual requirement, for example, may be set to 0.5. In this way, only objects of which a confidence level is greater than 0.5 in the target frame are reserved.

During actual implementation, the target frame may be screened. The to-be-inserted video may include a plurality of video fragments, and each video fragment may include one or more target frames, but not all target frames include the target object. As a result, target frames not including the target object may be deleted. For example, when it is determined that the target object is a table, target frames not including a table may be deleted, and detection is only performed for an advertising space in target frames including a table.

Figure 6:
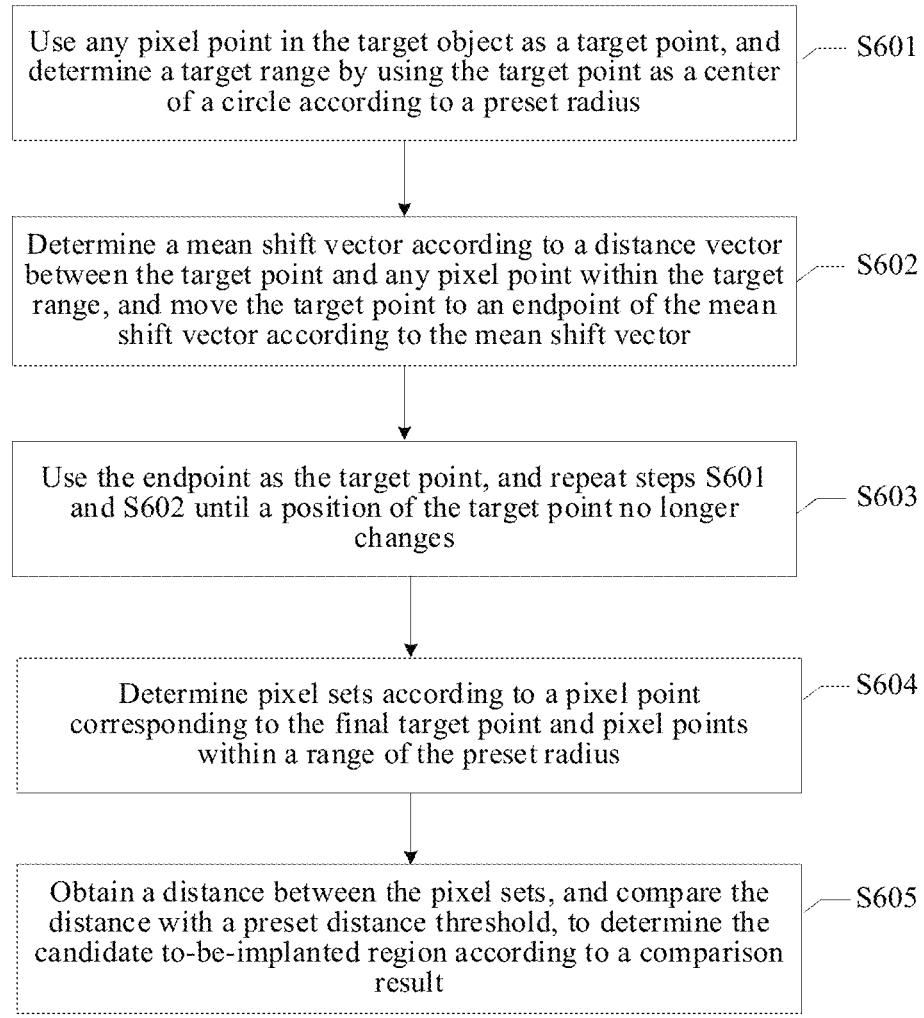
FIG. 6 is a schematic flowchart of performing mean shift processing on an object according to an embodiment of this disclosure.

In some embodiments, after the target object is obtained, pixel points in the target object may be clustered, to obtain a plurality of candidate to-be-inserted regions. During actual application, mean shift processing may be performed on the target object to cluster the object. FIG. 6 is a schematic flowchart of an exemplary method for performing mean shift processing on an object. As shown in FIG. 6, in step S601, any pixel point in the target object is used as a target point, and a target range is determined by using the target point as a center of a circle according to a preset radius. In step S602, a mean shift vector is determined according to a distance vector between the target point and any pixel point within the target range, and the target point is moved to an endpoint of the mean shift vector according to the mean shift vector. In step S603, the endpoint is used as the target point, and steps S601 and S602 are repeated until a position of the target point no longer changes. In step S604, pixel sets are determined according to a pixel point corresponding to the final target point and pixel points within a range of the preset radius. In step S605, a distance between the pixel sets is obtained, and the distance is compared with a preset distance threshold, to determine the candidate to-be-inserted region according to a comparison result.

When the candidate to-be-inserted region is determined according to the comparison result between the distance between the pixel sets and the preset distance threshold, the process may be performed according to the following manner:

When the distance between the pixel sets is less than or equal to the preset distance threshold, two pixel sets corresponding to the distance can be merged, to form the candidate to-be-inserted region.

When the distance between the pixel sets is greater than the preset distance threshold, the two pixel sets corresponding to the distance can be used as the candidate to-be-inserted region respectively.

By performing mean shift processing on the target object, a plurality of communicated regions in the target object may be obtained, and these communicated regions are the candidate to-be-inserted regions. For example, if the target object is a table, mean shift processing is performed for each pixel in the table, a plurality of communicated regions may be obtained, and these communicated regions form the table. During actual implementation, these communicated regions may all be used as candidate to-be-inserted regions for advertisement insertion in the table.

In step S340, a target candidate to-be-inserted region can be determined from the candidate to-be-inserted regions, and maximum rectangle searching can be performed in the target candidate to-be-inserted region to obtain a target to-be-inserted region.

In some embodiments, after the plurality of candidate to-be-inserted regions are determined, the candidate to-be-inserted regions may be screened to determine a target candidate to-be-inserted region. For example, candidate to-be-inserted regions not including non-target objects may be selected from the plurality of candidate to-be-inserted regions. For example, items such as mobile phones, teacups, vases, and the like are located on the table, to ensure the effect of advertisement insertion, candidate to-be-inserted regions including the items such as mobile phones, teacups, vases, and the like may be discarded, and only candidate to-be-inserted regions not including non-target objects are reserved. Areas of the candidate to-be-inserted regions not including non-target objects may then be calculated, and a candidate to-be-inserted region with a greatest area is selected as the target candidate to-be-inserted region. In this way, a core empty region of the target object with an optimal area and an empty region may be obtained.

In some embodiments, the shape of the target candidate to-be-inserted region may be irregular. If advertisement insertion is directly performed in the target candidate to-be-inserted region, information loss may occur. Therefore, after the target candidate to-be-inserted region, that is, the core empty region of the target object is determined, maximum rectangle searching further needs to be performed in the target candidate to-be-inserted region, to determine a target to-be-inserted region for advertisement insertion.

Figure 7:
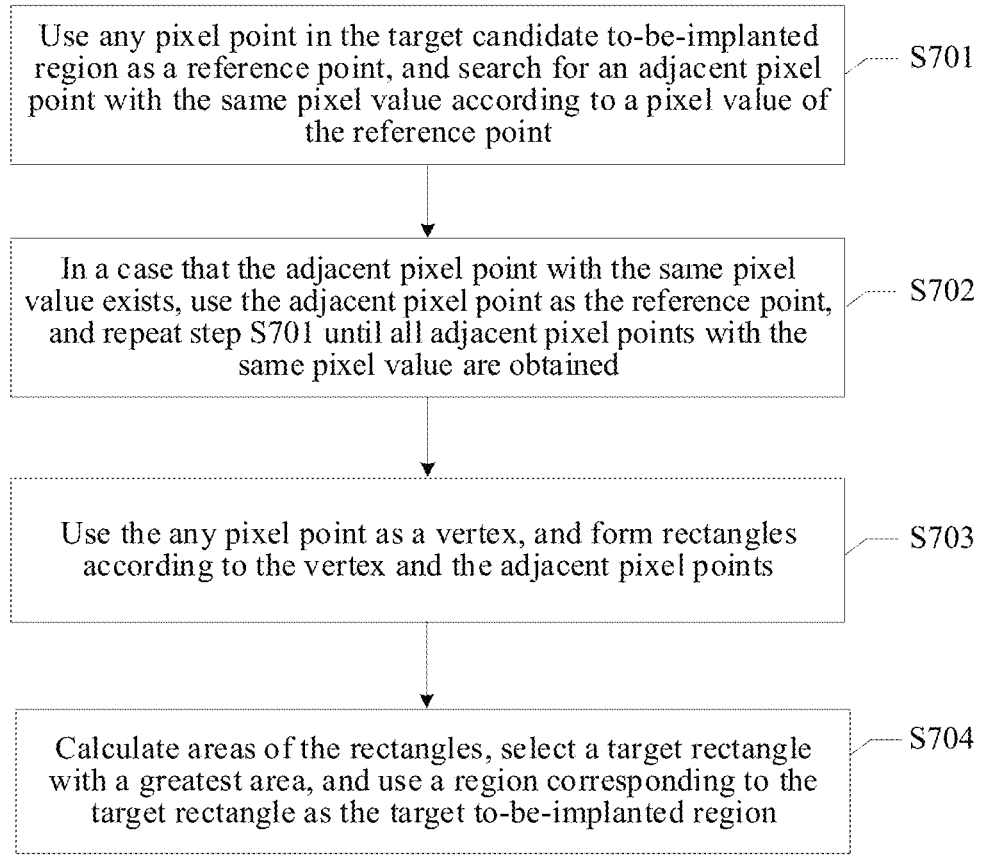
FIG. 7 is a flowchart of a method for performing maximum rectangle searching in a target candidate to-be-inserted region according to an embodiment of this disclosure.

FIG. 7 is a schematic flowchart of an exemplary method for performing maximum rectangle searching in a target candidate to-be-inserted region. As shown in FIG. 7, a procedure of performing maximum rectangle searching in the target candidate to-be-inserted region can include the following:

In step S701, any pixel point in the target candidate to-be-inserted region can be used as a reference point, and search can be performed for an adjacent pixel point with the same pixel value according to a pixel value of the reference point.

For example, pixel values of pixels in the target to-be-inserted region are 0 or 1, if a pixel value of a pixel point is 0, the pixel point is used as a reference point, and a pixel point with a pixel value of 0 and adjacent to the pixel point is searched for. If a pixel value of a pixel point is 1, the pixel point is used as a reference point, and a pixel point with a pixel value of 1 and adjacent to the pixel point is searched for.

In step S702, when the adjacent pixel point with the same pixel value exists, the adjacent pixel point can be used as the reference point. Step S701 can be repeated until all adjacent pixel points with the same pixel value are obtained.

For example, if there is a pixel point that is adjacent to the reference point and has the same pixel value with the reference point, the adjacent pixel point is used as the reference point to further expand outward, to determine whether there is another adjacent pixel point with the same pixel value, and all adjacent pixel points with the same pixel value may be obtained through a plurality of determinations.

In step S703, the any pixel point can be used as a vertex, and rectangles can be formed according to the vertex and the adjacent pixel points.

The pixel point initially used as the reference point is used as a vertex, and rectangles are formed according to the vertex and the adjacent pixel points. Pixel points in the rectangles have the same pixel value and pixel points with different pixel values are not included. The vertex may be a left vertex or a right vertex, which is not specifically limited in the embodiments of this disclosure.

In step S704, areas of the rectangles can be calculated, a target rectangle with a greatest area can be selected, and a region corresponding to the target rectangle can be used as the target to-be-inserted region.

A plurality of rectangles may be obtained through step S703, and an optimal information insertion region may be determined according to areas of the rectangles. During actual application, the areas of the rectangles may be calculated, a target rectangle with a greatest area is selected, and a region corresponding to the target rectangle is used as the target to-be-inserted region for advertisement insertion.

In some embodiments, some noise regions such as island noise regions may exist in the target to-be-inserted region, and these island noise regions are mainly formed through shadow changes of the target object. To prevent these island noise regions from affecting a maximum rectangle searching result, mean filtering may be performed on the target to-be-inserted region before maximum rectangle searching is performed in the target to-be-inserted region, to obtain a uniform and smooth target to-be-inserted region.

Figure 8A:
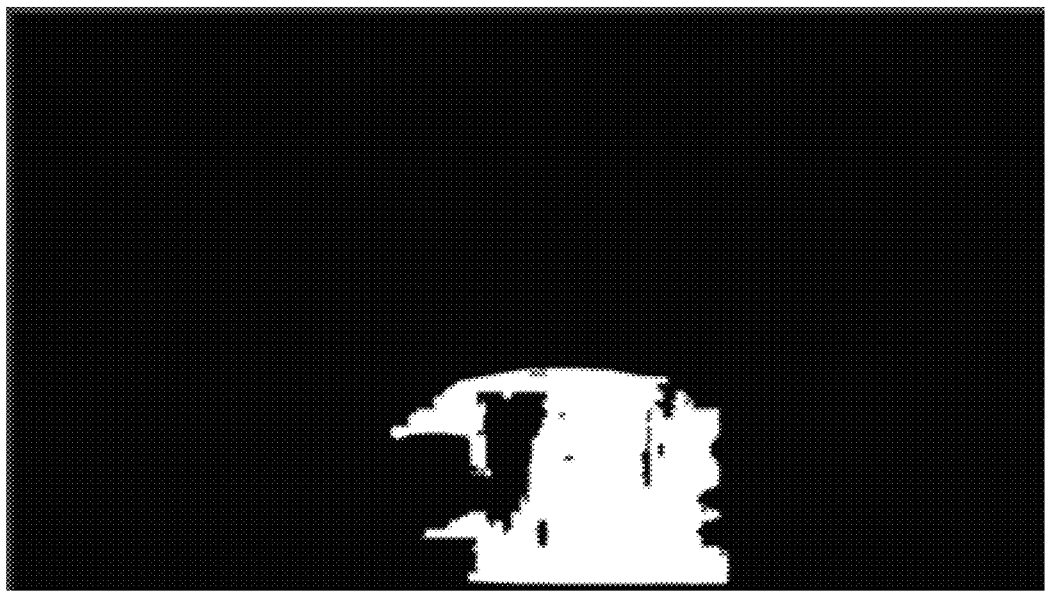
FIG. 8A is a schematic structural diagram of a table before island noise regions are eliminated according to an embodiment of this disclosure.
Figure 8B:
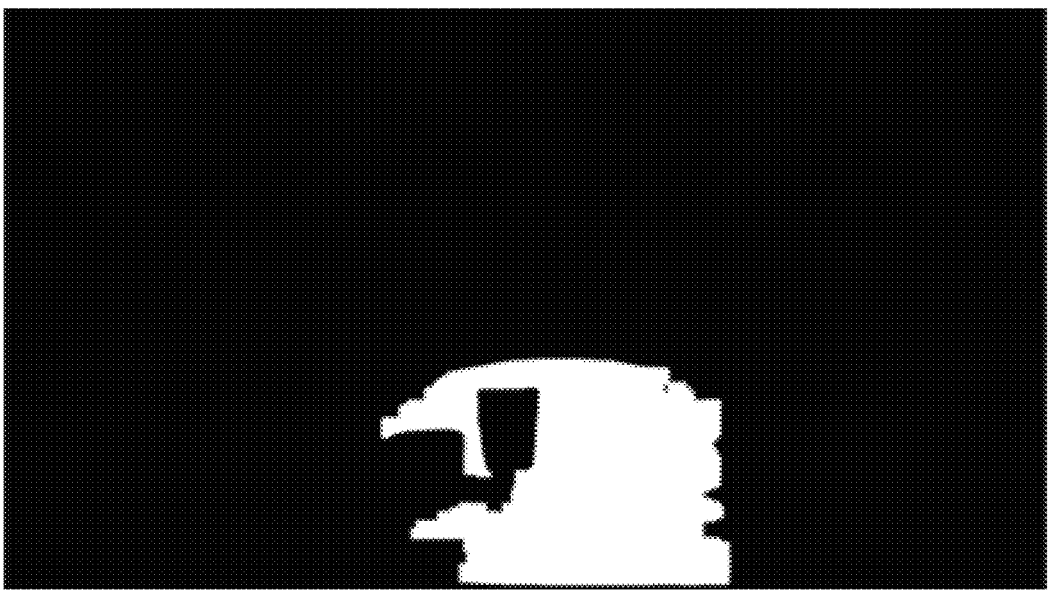
FIG. 8B is a schematic structural diagram of a table after island noise regions are eliminated according to an embodiment of this disclosure.

FIG. 8A is a schematic structural diagram of an exemplary table before the island noise regions are eliminated, and FIG. 8B is a schematic structural diagram of an exemplary table after the island noise regions are eliminated. As shown in FIG. 8A, there are some island noise regions in a core empty region of the table, which are small black regions shown in the figure; and as shown in FIG. 8B, after mean filtering is performed, these small black regions are eliminated, and the core empty region of the table becomes uniform and smooth.

The method for detecting an information insertion region in the embodiments of this disclosure may be used for detecting a region that may be used for advertisement insertion in a table, or may be used for detecting an advertisement insertion region in another object similar to the table, for example, detecting an advertisement insertion region in objects such as a cash table in a supermarket, a bench in a park, a running belt of a treadmill, and the like.

Figure 9:
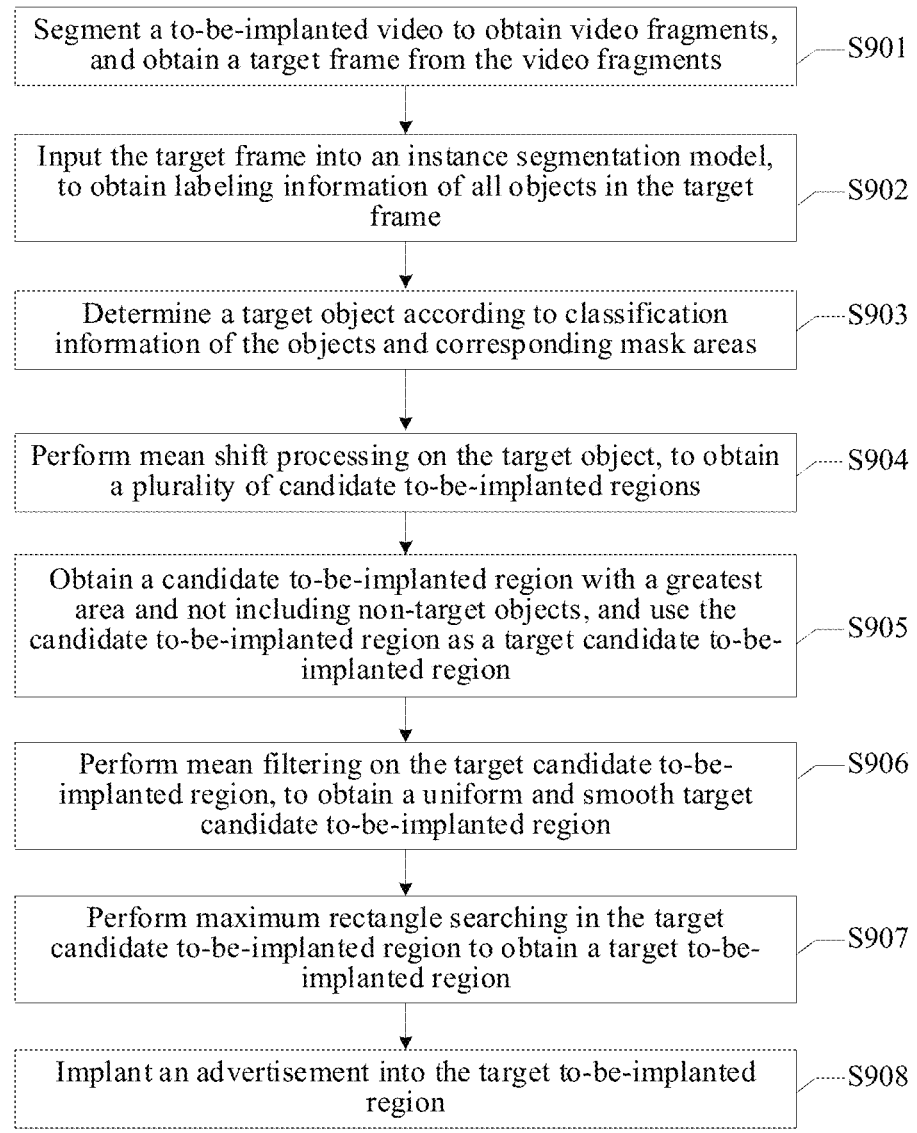
FIG. 9 is a flowchart of a method for advertisement insertion according to an embodiment of this disclosure.

Using an example in which advertisement insertion of a drink of a brand is performed on a cash table of a supermarket. FIG. 9 is a schematic flowchart of an exemplary method for advertisement insertion, and as shown in FIG. 9 the following steps can be provided.

In step S901, a to-be-inserted video can be segmented to obtain video fragments, and obtain a target frame from the video fragments.

Corresponding to a scene of performing advertisement insertion of a drink of a brand on a cash table of a supermarket, the target frame may be a scene of checkout in the supermarket.

In step S902, the target frame can be input into an instance segmentation model, to obtain labeling information of all objects in the target frame.

In step S903, a target object can be determined according to classification information of the objects and corresponding mask areas.

For example, in the target frame, a mask area corresponding to the cash table is the greatest, so that the cash table may be used as the target object.

In step S904, mean shift processing can be performed on the target object, to obtain a plurality of candidate to-be-inserted regions.

In step S905, a candidate to-be-inserted region with a greatest area and not including non-target objects can be obtained, and the candidate to-be-inserted region can be used as a target candidate to-be-inserted region.

Objects such as a display and an advertisement display card may be located on the cash table, to determine a core empty region in the cash table, a plurality of candidate to-be-inserted regions may be screened to obtain a target candidate to-be-inserted region.

In step S906, mean filtering can be performed on the target candidate to-be-inserted region, to obtain a uniform and smooth target candidate to-be-inserted region.

In step S907, maximum rectangle searching can be performed in the target candidate to-be-inserted region to obtain a target to-be-inserted region.

The target candidate to-be-inserted region herein is the empty region that may be used for advertisement insertion on the cash table, and the target to-be-inserted region may be an empty region close to the display on the cash table, or may be a corner close to an entrance of the cash table, which is not specifically limited in the embodiments of this disclosure.

In step S908, an advertisement can be inserted into the target to-be-inserted region.

When an advertisement of a drink of a brand is inserted, the advertisement may be a drink entity, or may be a 3D model including a drink propaganda poster, or the like.

The foregoing embodiment describes the method for detecting an information insertion region performed by a terminal device. Similarly, the method for detecting an information insertion region may alternatively be performed by a server, and the server may be a server dedicated to data processing. Correspondingly, an instance segmentation model is disposed in the server, after the terminal device 101 receives a to-be-inserted video sent by the server 105, the terminal device may send the to-be-inserted video to a server for data processing, and after receiving the to-be-inserted video, the server performs shot segmentation on the to-be-inserted video to obtain video fragments. The server then identifies and segments a target frame in the video fragments, to obtain labeling information of objects in the target frame. The server then determines a target object according to the labeling information, and clusters the target object to obtain a plurality of candidate to-be-inserted regions. Finally, the server determines a target candidate to-be-inserted region from the candidate to-be-inserted regions, performs maximum rectangle searching in the target candidate to-be-inserted region to obtain a target to-be-inserted region, and further sends the target to-be-inserted region to the terminal device 101 to implement video advertisement insertion.

According to the technical solution of the embodiments of this disclosure, the objects in the target frame are identified and segmented by using the instance segmentation model, and the target to-be-inserted region is determined from the target object in combination with color block clustering in a mask and maximum rectangle searching, thereby implementing automatic detection for an insertion advertising space. Compared with the original detection time that is 1.5 times of a duration of a video required by manual detection, the detection method in the embodiments of this disclosure may compress the required time to 0.2 times of a duration of a video, which on one hand reduces labor costs, and on the other hand, improves the detection efficiency. In addition, during actual application, the detection accuracy of the artificial intelligence-based method for detecting an information insertion region of the embodiments of this disclosure may reach 0.91, thereby greatly improving the accuracy of detecting an advertising space, and avoiding a case that advertising spaces determined through different manual screening processes are different.

The following describes apparatus embodiments of this disclosure, which may be used for performing the method for detecting an information insertion region in the foregoing embodiments of this disclosure. For details not disclosed in the apparatus embodiments of this disclosure, reference may be made to the embodiments of the method for detecting an information insertion region of this application as examples.

Figure 10:
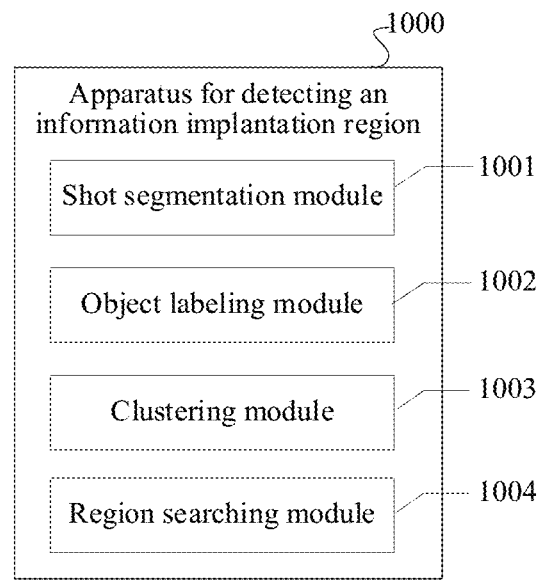
FIG. 10 is a block diagram of an apparatus for detecting an information insertion region according to an embodiment of this disclosure.

FIG. 10 exemplarily shows a block diagram of an apparatus for detecting an information insertion region according to an embodiment of this disclosure.

Referring to FIG. 10, an apparatus 1000 for detecting an information insertion region according to an embodiment of this disclosure can include: a shot segmentation module 1001, an object labeling module 1002, a clustering module 1003, and a region searching module 1004. One or more of modules of the apparatus can be implemented by processing circuitry, software, or a combination thereof, for example.

The shot segmentation module 1001 is configured to obtain a to-be-inserted video and segment the to-be-inserted video to obtain video fragments.

The object labeling module 1002 is configured to obtain a target frame in the video fragments, and identify and segment objects in the target frame, to obtain labeling information corresponding to the objects.

The clustering module 1003 is configured to determine a target object according to the labeling information, and cluster pixel points in the target object, to obtain a plurality of candidate to-be-inserted regions.

The region searching module 1004 is configured to determine a target candidate to-be-inserted region from the candidate to-be-inserted regions, and perform maximum rectangle searching in the target candidate to-be-inserted region to obtain a target to-be-inserted region.

In some embodiments, the detection apparatus 1000 further includes a serial number transmission module and a video receiving module.

The serial number transmission module is configured to transmit a to-be-inserted video obtaining request to a server, the to-be-inserted video obtaining request including a video serial number of the to-be-inserted video.

The video receiving module is configured to receive the to-be-inserted video returned by the server in response to the to-be-inserted video obtaining request and corresponding to the video serial number.

In some embodiments, the shot segmentation module 1001 includes a feature extraction unit and a similarity identification unit.

The feature extraction unit is configured to extract target features from the to-be-inserted video.

The similarity identification unit is configured to perform similarity identification on adjacent image frames, and segment the to-be-inserted video according to an identification result to obtain the video fragments.

In some embodiments, the object labeling module 1002 includes a model processing unit, configured to input the target frame into an instance segmentation model, and identify and segment the objects in the target frame by using the instance segmentation model, to obtain the labeling information.

In some embodiments, the model processing unit is configured to: preprocess the target frame by using the instance segmentation model, and perform feature extraction on the target frame after the preprocessing, to obtain a feature image; determine a plurality of candidate regions of interest on the feature image, and perform classification and regression on the plurality of regions of interest to obtain a target region of interest; perform an alignment operation on the target region of interest, to align pixels in the target frame with pixels in the target region of interest; and perform classification, bounding box regression, and mask generation on the target region of interest, to obtain the labeling information corresponding to the objects.

In some embodiments, the labeling information includes classification information, confidence levels, masks, and calibration boxes of the objects.

In some embodiments, the clustering module 1003 includes a target object determining unit and a clustering unit.

The target object determining unit is configured to determine the target object according to the classification information and areas of the masks in the labeling information.

The clustering unit is configured to perform mean shift processing on the target object, to cluster the pixel points in the target object and obtain the plurality of candidate to-be-inserted regions.

In some embodiments, there are a plurality of video fragments, and the video fragments include one or more target frames.

The clustering module 1003 may be further configured to: compare confidence levels of objects included in each target frame with a preset confidence level threshold respectively, and reserve the objects of which a confidence level is greater than the preset confidence level threshold in the each target frame; and delete target frames not including a to-be-inserted object, classification information of the to-be-inserted object and classification information of the target object being the same.

In some embodiments, the clustering unit includes a range determining unit, a moving unit, a repeating unit, a pixel set determining unit, and a comparing unit.

The range determining unit is configured to use any pixel point in the target object as a target point, and determine a target range by using the target point as a center of a circle according to a preset radius.

The moving unit is configured to determine a mean shift vector according to a distance vector between the target point and any pixel point within the target range, and move the target point to an endpoint of the mean shift vector according to the mean shift vector.

The repeating unit is configured to use the endpoint as the target point, and repeat the foregoing operations until a position of the target point no longer changes.

The pixel set determining unit is configured to determine pixel sets according to a pixel point corresponding to a final target point and pixel points within a range of the preset radius.

The comparing unit is configured to obtain a distance between the pixel sets, and compare the distance with a preset distance threshold, to determine the candidate to-be-inserted region according to a comparison result.

In some embodiments, the comparing unit is configured to: when the distance is less than or equal to the preset distance threshold, merge two pixel sets corresponding to the distance, to form the candidate to-be-inserted region; and when the distance is greater than the preset distance threshold, use the two pixel sets corresponding to the distance as the candidate to-be-inserted region respectively.

In some embodiments, the region searching module 1004 is configured to: obtain candidate to-be-inserted regions not including non-target objects from the candidate to-be-inserted regions; and calculate areas of the candidate to-be-inserted regions not including non-target objects, and use a candidate to-be-inserted region with a greatest area as the target candidate to-be-inserted region.

In some embodiments, the detection apparatus further includes: a filtering module, configured to perform mean filtering on the target candidate to-be-inserted region, to obtain a uniform and smooth target candidate to-be-inserted region.

In some embodiments, the region searching module 1004 is configured to: use any pixel point in the target candidate to-be-inserted region as a reference point, and search for an adjacent pixel point with the same pixel value according to a pixel value of the reference point; when the adjacent pixel point exists, use the adjacent pixel point as the reference point, and repeat the foregoing operation until all adjacent pixel points with the same pixel value are obtained; use the any pixel point as a vertex, and form rectangles according to the vertex and the adjacent pixel points; and calculate areas of the rectangles, select a target rectangle with a greatest area, and use a region corresponding to the target rectangle as the target to-be-inserted region.

Figure 11:
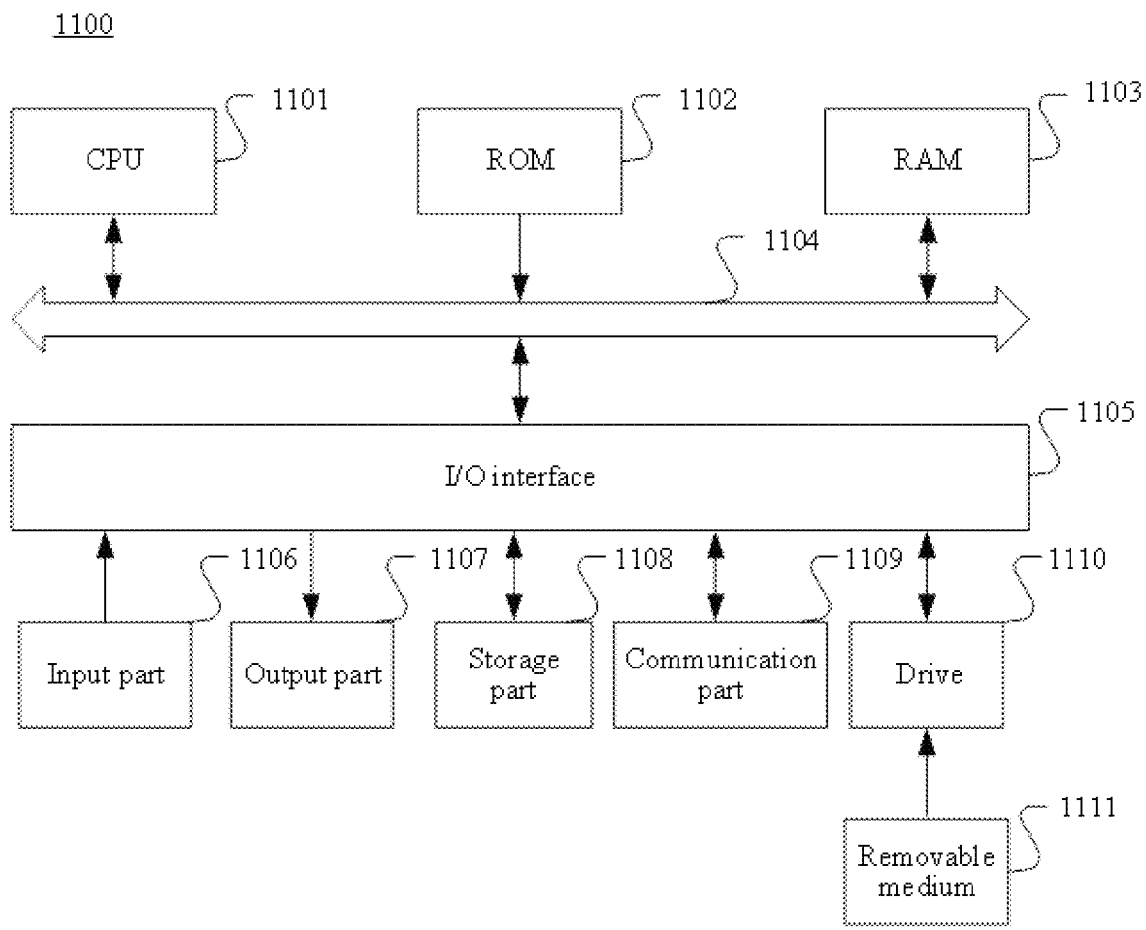
FIG. 11 is a schematic structural diagram of a computer system of an electronic device according to an embodiment of this disclosure.

FIG. 11 is a schematic structural diagram of a computer system of an electronic device according to an embodiment of this disclosure, and the electronic device is configured to implement the method for detecting an information insertion region according to the embodiments of this disclosure.

A computer system 1100 of the electronic device shown in FIG. 11 is merely an example, and does not constitute any limitation on functions and use ranges of the embodiments of this disclosure.

As shown in FIG. 11, the computer system 1100 includes a central processing unit (CPU) 1101, which may perform various suitable actions and processing based on a program stored in a read-only memory (ROM) 1102 or a program loaded from a storage part 1108 into a random access memory (RAM) 1103, for example, perform the method for detecting an information insertion region described in the foregoing embodiments. The RAM 1103 further stores various programs and data required for system operations. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard, a mouse, or the like, an output part 1107 including a cathode ray tube (CRT), a liquid crystal display (LCD), a speaker, or the like, a storage part 1108 including a hard disk, or the like, and a communication part 1109 including a network interface card such as a local area network (LAN) card or a modem. The communication part 1109 performs communication processing by using a network such as the Internet. A drive 1110 is also connected to the I/O interface 1105 as required. A removable medium 1111, such as a magnetic disk, an optical disc, a magneto-optical disk, or a semiconductor memory, is installed on the drive 1110 as required, so that a computer program read from the removable medium is installed into the storage part 1108 as required.

According to the embodiments of this disclosure, the processes described in the following with reference to the flowcharts may be implemented as computer software programs. For example, this embodiment of this disclosure includes a computer program product, the computer program product includes a computer program carried on a computer-readable medium, and the computer program includes program code used for performing the methods shown in the flowcharts. In such an embodiment, the computer program may be downloaded and installed from the network through the communication part 1109, and/or installed from the removable medium 1111. When the computer program is executed by the CPU 1101, the various functions defined in the system of this disclosure are executed.

The computer-readable medium shown in the embodiments of this disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk ROM (CD-ROM), an optical storage device, a magnetic storage device, or any appropriate combination thereof. In the embodiments of this disclosure, the computer-readable storage medium (e.g., a non-transitory computer-readable storage medium) may be any tangible medium including or storing a program, and the program may be used by or in combination with an instruction execution system, an apparatus, or a device. In the embodiments of this disclosure, the computer-readable signal medium may include a data signal propagated in a baseband or as a part of a carrier, and stores computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using processing circuitry such as a dedicated hardware-based system configured to perform a specified function or operation, or may be implemented by using a combination of dedicated hardware and a computer instruction.

A related unit described in the embodiments of this disclosure may be implemented in a software manner, or may be implemented in a hardware manner, and the unit described can also be set in a processor. Names of the units do not constitute a limitation on the units in a specific case.

An embodiment of this disclosure further provides a computer-readable medium. The computer-readable medium may be contained in the electronic device described in the foregoing embodiment, or may exist alone without being assembled into the electronic device. The computer-readable medium carries one or more programs, the one or more programs, when executed by the electronic device, causing the electronic device to implement the method for detecting an information insertion region according to the embodiments of this disclosure.

Although a plurality of modules or units of a device configured to perform actions are discussed in the foregoing detailed description, such division is not mandatory. Rather, according to the implementations of this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

After considering the disclosure and practicing the present disclosure, a person skilled in the art may conceive of other implementations of this disclosure. This disclosure is intended to cover any variations, uses, or adaptive changes of this disclosure. These variations, uses, or adaptive changes may follow the general principles of this disclosure and include common general knowledge or common technical means in the art, which are not disclosed in this disclosure.

This disclosure is not limited to the specific structures that are described above and that are shown in the accompanying drawings, and modifications and changes may be made without departing from the scope of this disclosure.

INDUSTRIAL PRACTICABILITY

In the embodiments of this disclosure, a to-be-inserted video is obtained, and the to-be-inserted video is segmented to obtain video fragments; a target frame in the video fragments is obtained, and objects in the target frame are identified and segmented to obtain labeling information corresponding to the objects; a target object is determined according to the labeling information, and the target object is clustered, to obtain a plurality of candidate to-be-inserted regions; and a target candidate to-be-inserted region is determined from the candidate to-be-inserted regions, and maximum rectangle searching is performed in the target candidate to-be-inserted region to obtain a target to-be-inserted region. In this way, whether there is an information insertion region in a video may be automatically detected, thereby avoiding manually label screening and reducing labor costs. Meanwhile, time for detecting an information insertion region can be greatly reduced, and the insertion efficiency and accuracy of a video advertisement are improved.

What is claimed is:

1. A method for detecting an information insertion region, the method comprising:
    obtaining a video;
    segmenting the video to obtain video fragments, each of the video fragments including a subset of image frames in the video;
    obtaining a target frame in the video fragments;
    identifying and segmenting objects in the target frame, to obtain labeling information corresponding to the objects;
    determining a target object according to the labeling information;
    performing clustering on the target object, to obtain a plurality of candidate to-be-inserted regions in the target object;
    determining whether each of the plurality of candidate to-be-inserted regions includes at least one non-target object;
    obtaining a subset of the plurality of candidate to-be-inserted regions that is determined not to include the at least one non-target object from the plurality of candidate to-be-inserted regions;
    calculating areas of the subset of the plurality of candidate to-be-inserted regions;
    determining, by processing circuitry, a target candidate to-be-inserted region in the target object from the subset of the plurality of candidate to-be-inserted regions in the target object based on the calculated areas of the subset of the plurality of candidate to-be-inserted regions; and
    performing maximum rectangle searching in the target candidate to-be-inserted region in the target object to obtain a target to-be-inserted sub-region of the target object in which an image is to be inserted.

2. The method according to claim 1, wherein the obtaining the video comprises:
    transmitting a video obtaining request to a server, the video obtaining request indicating an identifier of the video; and
    receiving the video corresponding to the identifier from the server.

3. The method according to claim 1, wherein the segmenting the video comprises:
    extracting target features of the image frames from the video;
    performing similarity identification on the target features of adjacent image frames; and
    segmenting the video according to an identification result of the similarity identification to obtain the video fragments.

4. The method according to claim 1, wherein the identifying and the segmenting the objects comprises:
    inputting the target frame into an instance segmentation model; and identifying and segmenting the objects in the target frame by using the instance segmentation model, to obtain the labeling information corresponding to the objects.

5. The method according to claim 4, wherein the identifying and the segmenting the objects comprises:
preprocessing the target frame by the instance segmentation model,
performing feature extraction on the target frame after the preprocessing, to obtain a feature image;
determining a plurality of candidate regions of interest on the feature image;
performing classification and regression on the plurality of candidate regions of interest, to obtain a target region of interest;
performing an alignment operation on the target region of interest, to align pixels in the target frame and pixels in the target region of interest; and
performing classification, bounding box regression, and mask generation on the target region of interest, to obtain the labeling information corresponding to the objects.

6. The method according to claim 1, wherein the labeling information includes at least one of classification information, confidence levels, masks, or calibration boxes of the objects.

7. The method according to claim 6, wherein
the determining the target object according to the labeling information includes determining the target object according to the classification information and areas of the masks in the labeling information; and
the performing clustering includes performing mean shift processing on the target object, to obtain the plurality of candidate to-be-inserted regions.

8. The method according to claim 7, wherein
the video fragments include a plurality of target frames; and
before the determining the target object, the method further includes:
comparing confidence levels of objects included in each of the target frames with a preset confidence level threshold respectively;
reserving the objects of which the confidence levels are greater than the preset confidence level threshold in the respective target frames; and
deleting one or more of the target frames not including a to-be-inserted object, classification information of the to-be-inserted object and classification information of the target object being the same.

9. The method according to claim 7, wherein the performing mean shift processing comprises:
using a pixel point in the target object as a target point;
determining a target range by using the target point as a center of a circle according to a preset radius;
determining a mean shift vector according to a distance vector between the target point and the pixel point within the target range;
moving the target point to an endpoint of the mean shift vector according to the mean shift vector;
determining the endpoint as the target point;
repeating the using the pixel point, the determining the target range, the determining the mean shift vector, the moving the target point, and the determining the endpoint until a position of the target point no longer changes;
determining pixel sets according to the pixel point corresponding to the target point of which the position no longer changes and pixel points within a range of the preset radius;
obtaining a distance between the pixel sets; and
comparing the distance with a preset distance threshold, to determine the candidate to-be- inserted region according to the comparison of the distance.

10. The method according to claim 9, wherein the comparing the distance comprises:
when the distance is less than or equal to the preset distance threshold, merging two pixel sets corresponding to the distance, to form the candidate to-be-inserted region; and
when the distance is greater than the preset distance threshold, using the two pixel sets corresponding to the distance as the candidate to-be-inserted region respectively.

11. The method according to claim 1, wherein the determining the target candidate to-be-inserted region comprises:
determining the candidate to-be-inserted region with a greatest area as the target candidate to-be-inserted region.

12. The method according to claim 1, wherein before the performing the maximum rectangle searching, the method further comprises:
performing mean filtering on the target candidate to-be-inserted region, to obtain a uniform and smooth target candidate to-be-inserted region.

13. The method according to claim 12, wherein the performing the maximum rectangle searching comprises:
for each of a plurality of adjacent pixel points with a same pixel value,
using the respective pixel point within the target candidate to-be-inserted region as a reference point,
searching for the adjacent pixel point with the same pixel value according to a pixel value of the reference point, and
when the adjacent pixel point exists, determining the adjacent pixel point as the reference point;
determining an initial pixel point of the plurality of adjacent pixel points as a vertex;
forming rectangles according to the vertex and the adjacent pixel points;
calculating areas of the rectangles;
selecting a target rectangle of the rectangles with a greatest area; and
determining a region corresponding to the target rectangle as the target to-be-inserted sub-region.

14. An apparatus for detecting an information insertion region, comprising:
processing circuitry configured to:
obtain a video;
segment the video to obtain video fragments, each of the video fragments including a subset of image frames in the video;
obtain a target frame in the video fragments;
identify and segment objects in the target frame, to obtain labeling information corresponding to the objects;
determine a target object according to the labeling information;
perform clustering on the target object, to obtain a plurality of candidate to-be- inserted regions in the target object;

determine whether each of the plurality of candidate to-be-inserted regions includes at least one non-target object;

obtain a subset of the plurality of candidate to-be-inserted regions that is determined not to include the at least one non-target object from the plurality of candidate to-be- inserted regions;

calculate areas of the subset of the plurality of candidate to-be-inserted regions;

determine a target candidate to-be-inserted region in the target object from the subset of the plurality of candidate to-be-inserted regions in the target object based on the calculated areas of the subset of the plurality of candidate to-be-inserted regions; and perform maximum rectangle searching in the target candidate to-be-inserted region in the target object to obtain a target to-be-inserted sub-region of the target object in which an image is to be inserted.

15. The apparatus according to claim 14, wherein the processing circuitry is configured to:

transmit a video obtaining request to a server, the video obtaining request indicating an identifier of the video; and receive the video corresponding to the identifier from the server.

16. The apparatus according to claim 14, wherein the processing circuitry is configured to:

extract target features of the image frames from the video;

perform similarity identification on the target features of adjacent image frames; and segment the video according to an identification result of the similarity identification to obtain the video fragments.

17. The apparatus according to claim 14, wherein the processing circuitry is configured to:

input the target frame into an instance segmentation model; and identify and segment the objects in the target frame by using the instance segmentation model, to obtain the labeling information corresponding to the objects.

18. The apparatus according to claim 17, wherein the processing circuitry is configured to:

preprocess the target frame by the instance segmentation model, perform feature extraction on the target frame after the preprocessing, to obtain a feature image;

determine a plurality of candidate regions of interest on the feature image;

perform classification and regression on the plurality of candidate regions of interest, to obtain a target region of interest;

perform an alignment operation on the target region of interest, to align pixels in the target frame and pixels in the target region of interest; and perform classification, bounding box regression, and mask generation on the target region of interest, to obtain the labeling information corresponding to the objects.

19. The apparatus according to claim 14, wherein the labeling information includes at least one of classification information, confidence levels, masks, or calibration boxes of the objects.

20. A non-transitory computer-readable storage medium, storing instructions which when executed by at least one processor cause the at least one processor to perform:

obtaining a video;

segmenting the video to obtain video fragments, each of the video fragments including a subset of image frames in the video;

obtaining a target frame in the video fragments;

identifying and segmenting objects in the target frame, to obtain labeling information corresponding to the objects;

determining a target object according to the labeling information;

performing clustering on the target object, to obtain a plurality of candidate to-be-inserted regions in the target object;

determining whether each of the plurality of candidate to-be-inserted regions includes at least one non-target object;

obtaining a subset of the plurality of candidate to-be-inserted regions that is determined not to include the at least one non-target object from the plurality of candidate to-be-inserted regions;

calculating areas of the subset of the plurality of candidate to-be-inserted regions;

determining a target candidate to-be-inserted region in the target object from the subset of the plurality of candidate to-be-inserted regions in the target object based on the calculated areas of the subset of the plurality of candidate to-be-inserted regions; and performing maximum rectangle searching in the target candidate to-be-inserted region in the target object to obtain a target to-be-inserted sub-region of the target object in which an image is to be inserted.

* * * * *

UNITED STATES PATENT AND TRADEMARK OFFICE
CERTIFICATE OF CORRECTION

PATENT NO. : 12,073,621 B2
APPLICATION NO. : 17/370764
DATED : August 27, 2024
INVENTOR(S) : Hui Sheng et al.

It is certified that error appears in the above-identified patent and that said Letters Patent is hereby corrected as shown below:

On the Title Page

Item (71), the Applicant city reads as:
Guangdong (CN)
Should read as:
--Shenzhen (CN)--

Item (73), the Assignee city reads as:
Guangdong (CN)
Should read as:
--Shenzhen (CN)--

Signed and Sealed this
Fifteenth Day of October, 2024

Katherine Kelly Vidal
*Director of the United States Patent and Trademark Office*